United States Patent
Lee et al.

(10) Patent No.: US 8,289,928 B2
(45) Date of Patent: Oct. 16, 2012

(54) APPARATUS AND METHOD FOR HANDOVER IN WIRELESS COMMUNICATION SYSTEM

(75) Inventors: Neung-Hyung Lee, Seongnam-si (KR); Sung-Oh Kwon, Seoul (KR); Jong-In Kim, Seongnam-si (KR); Ho-Sun Youm, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 12/800,191

(22) Filed: May 11, 2010

(65) Prior Publication Data

US 2010/0290430 A1 Nov. 18, 2010

(30) Foreign Application Priority Data

May 13, 2009 (KR) .................. 10-2009-0041526

(51) Int. Cl.
*H04W 4/00* (2009.01)
(52) U.S. Cl. ........................ 370/331; 370/349
(58) Field of Classification Search .............. 370/310.2, 370/331, 332, 349, 328
See application file for complete search history.

(56) References Cited

U.S. PATENT DOCUMENTS

| | | | |
|---|---|---|---|
| 2007/0291695 A1* | 12/2007 | Sammour et al. | 370/331 |
| 2008/0182579 A1* | 7/2008 | Wang et al. | 455/436 |
| 2009/0005031 A1 | 1/2009 | Van Lieshout et al. | |
| 2009/0061878 A1* | 3/2009 | Fischer | 455/436 |
| 2009/0190554 A1* | 7/2009 | Cho | 370/331 |
| 2009/0191874 A1* | 7/2009 | Du et al. | 455/436 |

FOREIGN PATENT DOCUMENTS

| | | |
|---|---|---|
| EP | 2 001 246 A2 | 12/2008 |
| KR | 10-2009-0006711 | 1/2009 |
| WO | WO 2009/020361 A2 | 2/2009 |

OTHER PUBLICATIONS

International Search Report dated Dec. 24, 2010 in connection with International Application No. PCT/KR2010/003030.
Written Opinion of International Searching Authority dated Dec. 24, 2010 in connection with International Application No. PCT/KR2010/003030.

* cited by examiner

Primary Examiner — Brenda H Pham

(57) ABSTRACT

An apparatus and method provide an effective handover of a User Equipment (UE) in a wireless communication system from a macro evolved Node-B (eNB) to a relay eNB). In a method of supporting a handover of a User Equipment (UE) by a macro evolved Node-B (eNB) in a wireless communication system, a handover of the UE to a relay eNB is determined. A handover request and RRC connection setup message is transmitted to the relay eNB by integrating a handover request message for requesting a handover of the UE and an RRC connection setup message for requesting RRC connection setup between the macro eNB and the relay eNB. A handover request response and RRC connection setup response message are received from the relay eNB by integrating a handover request response message and an RRC connection setup response message.

20 Claims, 11 Drawing Sheets

APPARATUS AND METHOD FOR HANDOVER IN WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on May 13, 2009 and assigned Serial No. 10-2009-0041526, the entire disclosure of which is hereby incorporated by reference.

TECHNICAL FIELD OF THE INVENTION

The present invention relates to an apparatus and method for a handover in a wireless communication system. More particularly, the present invention relates to an apparatus and method for an effective handover of a User Equipment (UE) from a macro evolved Node-B (eNB) to a relay eNB in a wireless communication system.

BACKGROUND OF THE INVENTION

A relay has been standardized in the Institute of Electrical and Electronics Engineers (IEEE) 802.16 series for the purpose of removing a shadow area of a cell and for improving a system throughput. In addition, the introduction of the relay has also been discussed in the release 9 of $3^{rd}$ Generation Partnership Project Long Term Evolution (3GPP LTE).

The 3GPP LTE classifies the relay into three types, i.e., a Layer (L1 relay, an L2 relay, and an L3 relay. With regard to the L1 relay, a relay evolved Node-B (eNB) is a repeater for transmitting the same signal as that of a macro eNB. With regard to the L2 relay, the relay eNB transmits its own broadcast information and control signaling information, and also performs scheduling. With regard to the L2 relay, a macro eNB that sets up a radio link to the relay eNB manages data communication with respect to the relay eNB. Because the relay eNB is regarded as a different entity from a User Equipment (UE), the radio link which is set up between the macro eNB and the relay eNB is handled specially in scheduling of the macro eNB. In general, the relay of the IEEE 802.16 series corresponds to the L2 relay. The L3 relay differs from the L2 relay in that the radio link which is set up between the macro eNB and the relay eNB and a radio link which is set up between the macro eNB and a typical UE are handled equally without distinction in the scheduling of the macro eNB. Additionally in the L3 relay, the macro eNB and the relay eNB create an X2 interface, and the X2 interface is also created with a radio link because the macro eNB and the relay eNB are connected only with the radio link.

Meanwhile, a process of performing a handover from a macro eNB to a relay eNB by a UE in the conventional an L3-relay system of 3GPP LTE is as follows. When the UE moves to a region close in distance to a service area of the relay eNB while receiving a service from the macro eNB, and thus a certain condition is satisfied, the macro eNB detects a handover of the UE on the basis of a measurement report message of the UE. Upon the detecting the handover of the UE, a serving eNB (i.e., the macro eNB) and a target eNB (i.e., the relay eNB) exchange a handover request message and a handover request response message through an X2 interface, and in this case, the relay eNB performs call admission control. Since the X2 interface is created by the macro eNB and the relay eNB through a relay link, the handover request message and the handover request response message also have to be transmitted through the radio link. If the radio link between the macro eNB and the relay eNB is not created (that is, if a connection is not established), the macro eNB and the relay eNB have to exchange a paging message, a Radio Resource Control (RRC) connection request message, an RRC connection setup message, and an RRC connection setup complete message to create the radio link. If the radio link between the macro eNB and the relay eNB is created, information on a radio link change which may occur between the macro eNB and the relay eNB due to a handover has to be sent by the macro eNB to the relay eNB, and this process is performed by exchanging an RRC connection reconfiguration message and an RRC connection reconfiguration complete message. As such, the handover of the UE from the macro eNB to the relay eNB requires exchange of not only an X2 signaling message but also an RRC signal message.

In the conventional technique, a handover process is separated from an RRC connection process and an RRC connection reconfiguration process, and the macro eNB does not perform call admission control even if it can perform the call admission control, which leads to the following problems. First, an amount of messages exchanged between the macro eNB and the relay eNB increases. If there is no connection established between the macro eNB and the relay eNB, the macro eNB has to exchange a paging message, an RRC connection request message, an RRC connection setup message, and an RRC connection setup complete message with the relay eNB before the macro eNB transmits a handover request message to the relay eNB, which causes a significantly long handover delay. Further, even if there is a connection established between the macro eNB and the relay eNB, a process of exchanging an RRC connection reconfiguration message and an RRC connection reconfiguration complete message between the macro eNB and the relay eNB is necessary. Second, when the relay eNB fails in call admission in a call admission control process, in many cases, it is because resources are not ensured over a radio link between the macro eNB and the relay eNB. The relay eNB performs call admission control for determining whether to admit a call request of the UE upon receiving the handover request message for requesting a call of the UE from the macro eNB. In this case, even if a large amount of radio link resources are present between the relay eNB and the UE, the relay eNB cannot admit the call request of the UE when an amount of radio link resources between the macro eNB and the relay eNB is limited.

SUMMARY OF THE INVENTION

To address the above-discussed deficiencies of the prior art, it is a primary aspect of the present invention to at least solve the above-mentioned problems and/or disadvantages and to at least provide the advantages described below. Accordingly, an aspect of the present invention is to provide an apparatus and method for a handover in a wireless communication system.

One aspect of the present invention is to provide an apparatus and method for an effective handover of a User Equipment (UE) from a macro evolved Node-B (eNB) to a relay eNB in a wireless communication system.

Another aspect of the present invention is to provide an apparatus and method for decreasing an amount of messages exchanged between a macro eNB and a relay eNB by integrating an X2 signaling message and Radio Resource Control (RRC) signaling message exchanged between the macro eNB and the relay eNB for a handover of a UE from the macro eNB to the relay eNB in a wireless communication system.

Yet another aspect of the present invention is to provide an apparatus and method for decreasing the occurrence of unnecessarily exchanging a handover signaling message by performing call admission control by a macro eNB prior to a relay eNB, for a handover of a UE from the macro eNB to the relay eNB in a wireless communication system.

In accordance with an embodiment of the present invention, a method of supporting a handover of a UE by a macro eNB in a wireless communication system is provided. According to the method, a handover of the UE to a relay eNB is determined. A handover request and RRC connection setup message to the relay eNB is transmitted by integrating a handover request message for requesting a handover of the UE and an RRC connection setup message for requesting RRC connection setup between the macro eNB and the relay eNB. A handover request response and RRC connection setup response message is received from the relay eNB by integrating a handover request response message and an RRC connection setup response message.

In accordance with another embodiment of the present invention, a method of supporting a handover of a UE by a relay eNB in a wireless communication system is provided. A handover request and RRC connection setup/reconfiguration message is received from a macro eNB by integrating a handover request message for requesting a handover of the UE and an RRC connection setup/reconfiguration message for requesting RRC connection setup/reconfiguration between the macro eNB and the relay eNB. Call admission control for the UE is performed. A handover request response and RRC connection setup/reconfiguration response message is transmitted to the macro eNB by integrating a handover request response message and RRC connection setup/reconfiguration response message according to a result obtained by performing the call admission control.

In accordance with yet another embodiment of the present invention, a macro eNB for supporting a handover of a UE in a wireless communication system is provided. The macro eNB includes a message integrator/parser for creating a handover request and RRC connection setup message by integrating a handover request message for requesting a handover of the UE and an RRC connection setup message for requesting an RRC connection setup between the macro eNB and a relay eNB according to a determination result on a handover of the UE to the relay eNB. A physical-radio link layer is configured to transmit the generated handover request and RRC connection setup message to the relay eNB and receive a handover request response and RRC connection setup response message from the relay eNB by integrating a handover request response message and an RRC connection setup response message.

In accordance with yet another embodiment of the present invention, a relay eNB for supporting a handover of a UE in a wireless communication system is provided. The relay eNB includes a physical-radio link layer for receiving a handover request and RRC connection setup/reconfiguration message from a macro eNB by integrating a handover request message for requesting a handover of the UE and an RRC connection setup/reconfiguration message for requesting RRC connection setup/reconfiguration between the macro eNB and the relay eNB. An X2 signaling controller is configured to perform call admission control for the UE. A message integrator/parser is configured to generate a handover request response and RRC connection setup/reconfiguration response message by integrating a handover request response message and RRC connection setup/reconfiguration response message according to a result obtained by performing the call admission control, wherein the physical-radio link layer transmits the generated handover request response and RRC connection setup/reconfiguration response message to the macro eNB.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention relates to an apparatus and method for an effective handover of a User Equipment (UE) from a macro evolved Node-B (eNB) to a relay eNB in a wireless communication system. In particular, the present invention relates to a method in which a new handover signaling message is defined by integrating an X2 signaling message and Radio Resource Control (RRC) signaling message exchanged between a macro eNB and a relay eNB, and the macro eNB performs call admission control prior to the relay eNB to decrease unnecessary exchange of a handover signaling message.

Although a Layer 3 (L3) relay system of $3^{rd}$ Generation Partnership Project Long Term Evolution (3GPP LTE) will be described hereinafter as an example, the present invention may also apply to other types of wireless communication systems. One example of the wireless communication system is a communication system using an Orthogonal Frequency Division Multiplexing (OFDM)/Orthogonal Frequency Division Multiple Access (OFDMA) scheme. Because the OFDM/OFDMA scheme is used, a plurality of sub-carriers is used to transmit and receive a physical channel signal, thereby achieving fast data transmission. In addition, a multi-cell structure may be used to support mobility of the UE.

Figure 1:
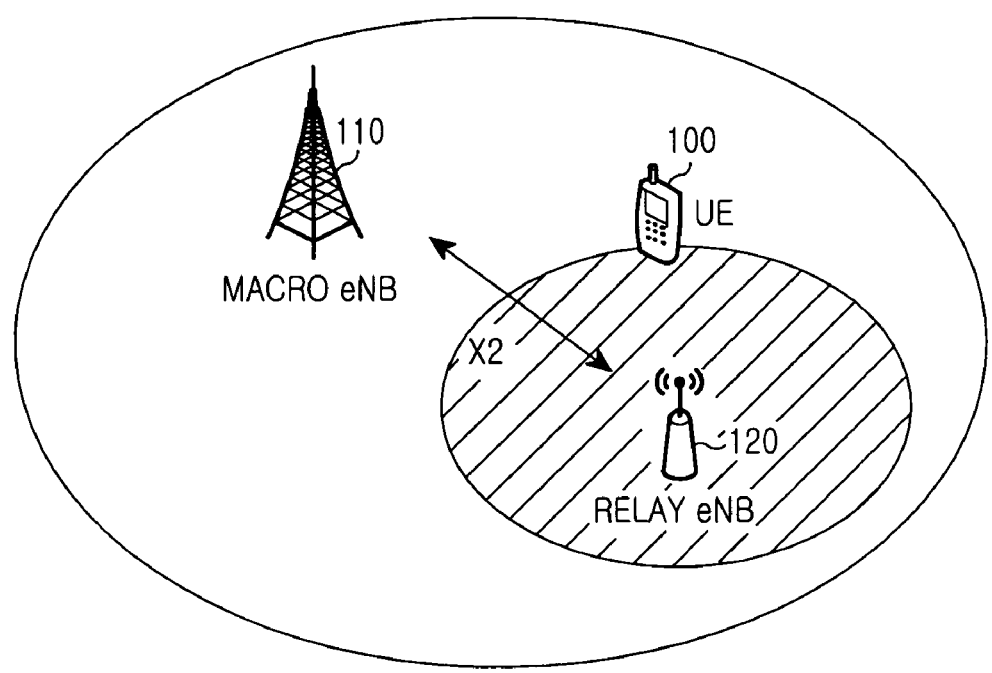
FIG. 1 illustrates a wireless communication system that supports a handover from a macro eNB to a relay eNB by a UE according to the principles of the present invention.

FIG. 1 illustrates a wireless communication system that supports a handover from a macro eNB to a relay eNB by a UE according to the principles of the present invention.

Referring to FIG. 1, while receiving a service by accessing a macro eNB 110, a UE 100 may move to a service cell area of a relay eNB 120 in a cell area of the macro eNB 110. In this case, the UE 100 performs a handover from the macro eNB 110 to the relay eNB 120.

Figure 2:
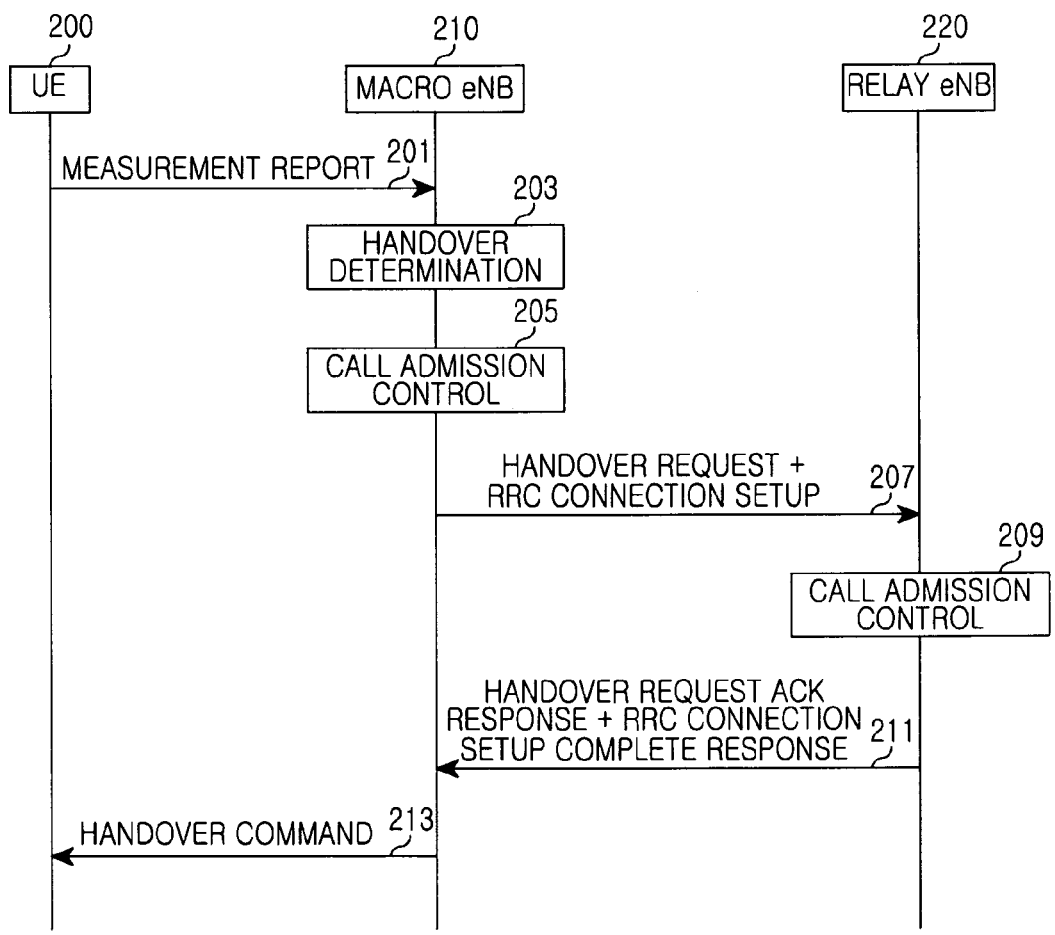
FIG. 2 illustrates a process of exchanging a handover signaling message for a handover from a macro eNB to a relay eNB not having a Radio Resource Control (RRC) connection in a wireless communication system according to an embodiment of the present invention.

FIG. 2 illustrates a process of exchanging a handover signaling message for a handover from a macro eNB to a relay eNB not having an RRC connection in a wireless communication system according to an embodiment of the present invention. In FIG. 2, call admission control of the relay eNB is successful, and thus the handover process is also successful.

Referring to FIG. 2, while receiving a service by accessing a macro eNB 210, a UE 200 measures a channel state of neighbor macro eNBs and neighbor relay eNBs including a relay eNB 220 periodically or in an event-driven manner, and transmits a measurement report message 201 including a measurement result to the macro eNB 210.

Upon receiving the measurement report message 201, the macro eNB 210 determines whether to perform a handover of the UE 200 to the neighbor macro eNB (or the neighbor relay eNB) on the basis of the measurement result in block 203. If a channel state between the UE 200 and the neighbor macro eNB (or the neighbor relay eNB) is better than a channel state between the UE 200 and the macro eNB 210, the macro eNB 210 may determine to perform the handover of the UE 200 to the neighbor macro eNB (or the neighbor relay eNB). By considering a situation where an L3 relay handover is performed from the macro eNB 210 to the relay eNB 220 by the UE 200, it is assumed in the present invention that the channel state between the UE 200 and the relay eNB 220 is better than the channel state between the UE 200 and the macro eNB 210, and the macro eNB 210 determines to perform the handover of the UE 200 to the relay eNB 220.

If it is determined to perform the handover of the UE 200 to the relay eNB 220, the macro eNB 210 performs call admission control for a call request of the UE 200 prior to a target eNB (i.e., the relay eNB 220) in block 205. The reason for the macro eNB 210 to perform the call admission control is that, if the handover of the UE 200 to the relay eNB 220 is successful, a radio link resource of the macro eNB 210 is used for data transmitted to or received by the UE 200 via the relay eNB 220 from the macro eNB 210. If the radio link resource of the macro eNB 210 is insufficient, even if the relay eNB 220 successfully performs the call admission control for the call request of the UE 200, and thus successfully performs the handover, transmission from the macro eNB 210 to the relay eNB 220 may be impossible and thus data drop may occur. That is, the call admission control of the macro eNB 210 is performed in block 205 for the purpose of determining whether the macro eNB 210 may pre-allocate a radio link resource to the relay eNB 220, and thus to avoid data drop which may occur after the successful handover. The macro eNB 210 may perform the call admission control in block 205 for the call request of the UE 200 by evaluating an amount of the radio link resource between the macro eNB 210 and the relay eNB 220. As a result, if the amount of the radio link resource between the macro eNB 210 and the relay eNB 220 is sufficient to allocate the radio link resource to the relay eNB 220, that is, if the amount of the radio link resource between the macro eNB 210 and the relay eNB 220 is greater than or equal to an amount of a radio link resource to be allocated to the relay eNB 220 according to the handover of the UE 200, the macro eNB 210 may determine to admit the call request of the UE 200, and otherwise, may determine to deny the call request.

If it is determined that the call request of the UE 200 is admitted, the macro eNB 210 transmits a handover request and RRC connection setup message 207 to the relay eNB 220 by integrating a handover request message and an RRC connection setup message. That is, the macro eNB 210 transmits an X2 signaling message and an RRC signaling message concurrently to the relay eNB 220. In this example, an RRC connection setup part of the handover request and RRC connection setup message 207 transmitted by the macro eNB 210 is provided to directly establish an RRC connection to the relay eNB 220 when it is desired by the macro eNB 210 under the assumption that the relay eNB 220 does not move frequently unlike the UE 200.

Upon receiving the handover request and RRC connection setup message 207, the relay eNB 220 performs the call admission control for the call request of the UE 200 in block 209. The relay eNB 220 may perform the call admission control in block 209 for the call request of the UE 200 by evaluating an amount of the radio link resource between the relay eNB 220 and the UE 200. As a result, if the amount of the radio link resource between the relay eNB 220 and the UE 200 is sufficient to allocate the radio link resource to the UE 200, that is, if the amount of the radio link resource between the relay eNB 220 and the UE 200 is greater than or equal to an amount of a radio link resource to be allocated to the UE 200 according to the handover of the UE 200, the relay eNB 220 may determine to admit the call request of the UE 200, and otherwise, may determine to deny the call request.

Thereafter, if the call request of the UE 200 is admitted under the call admission control in block 209, the relay eNB 220 sets up an RRC connection, and transmits a handover request Acknowledgment (ACK) response and RRC connection setup complete response message 211 to the macro eNB 210 by integrating a handover request ACK response message and an RRC connection setup complete response message.

Upon receiving the handover request ACK response and RRC connection setup complete response message 211, the macro eNB 210 determines that the handover to the relay eNB 220 is possible, transmits a handover command message 213 to the UE 200, and instructs the handover to the relay eNB 220.

Figure 3:
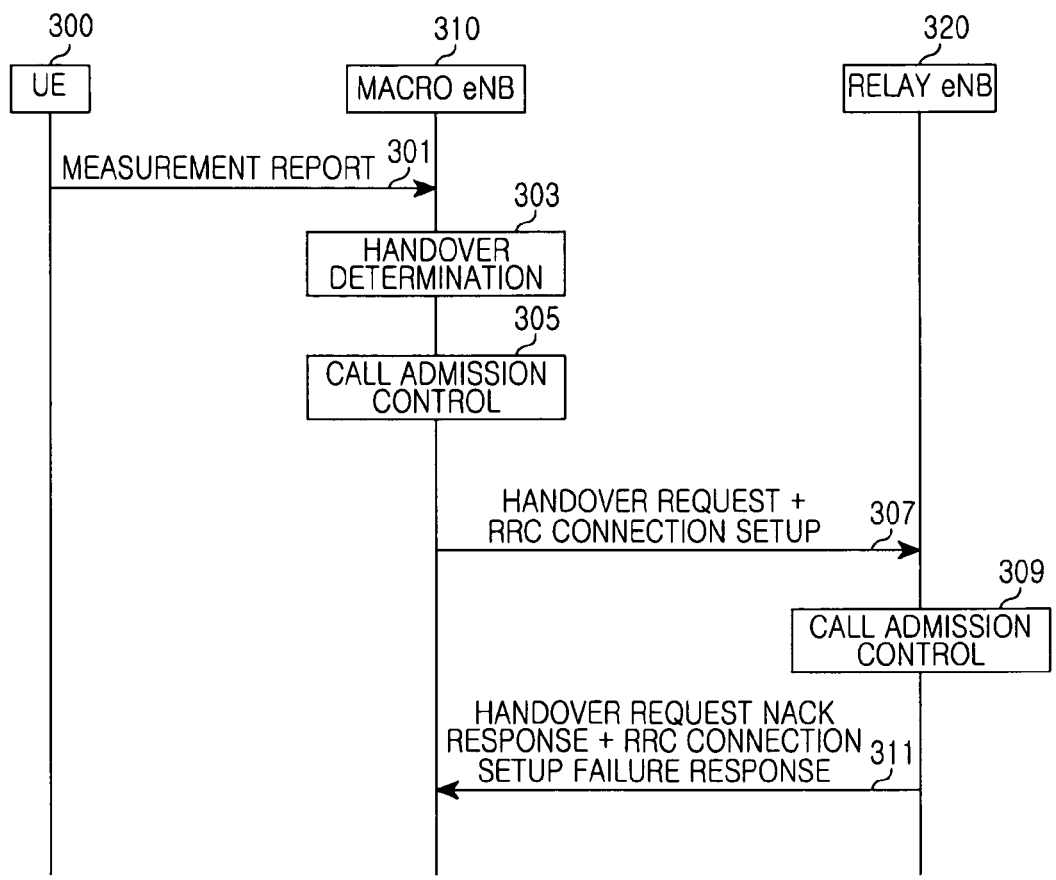
FIG. 3 illustrates a process of exchanging a handover signaling message for a handover from a macro eNB to a relay eNB not having an RRC connection in a wireless communication system according to an embodiment of the present invention.

FIG. 3 illustrates a process of exchanging a handover signaling message for a handover from a macro eNB to a relay eNB not having an RRC connection in a wireless communication system according to an embodiment of the present invention. In FIG. 3, call admission control of the relay eNB fails, and thus the handover process also fails.

Referring to FIG. 3, elements 301 to 309 of FIG. 3 are identical to elements 201 to 209 of FIG. 2 above, and thus descriptions on elements 301 to 309 will be omitted.

After the call admission control in block 309, if it is determined that a call request of a UE 300 is denied under the call admission control, a relay eNB 320 transmits a handover request Negative ACK (NACK) response and RRC connection setup failure response message 311 to a macro eNB 310 by integrating a handover request NACK response message and an RRC connection setup failure response message. In this example, upon receiving the handover request NACK response and RRC connection setup failure response message 311, the macro eNB 310 determines that a handover to the relay eNB 320 is impossible, and thus ends the handover process of the UE 300.

Figure 4:
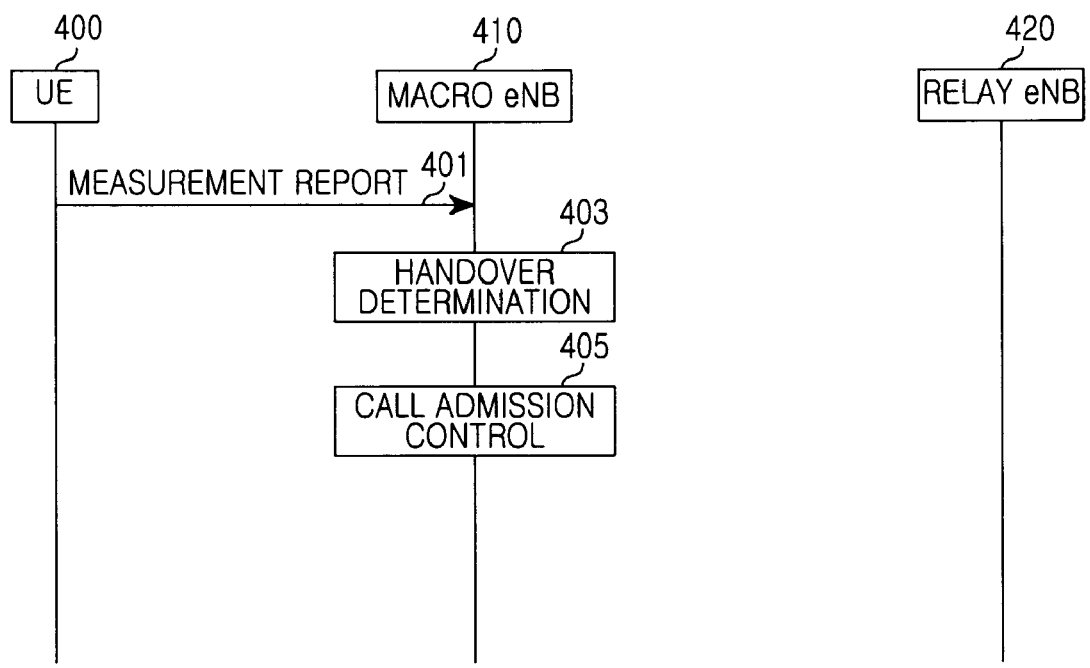
FIG. 4 illustrates a process of exchanging a handover signaling message for a handover from a macro eNB to a relay eNB not having an RRC connection in a wireless communication system according to an embodiment of the present invention.

FIG. 4 illustrates a process of exchanging a handover signaling message for a handover from a macro eNB to a relay eNB not having an RRC connection in a wireless communication system according to an embodiment of the present invention. In FIG. 4, call admission control of the macro eNB fails, and thus the handover process also fails before a handover signaling message is exchanged.

Referring to FIG. 4, while receiving a service by accessing a macro eNB 410, a UE 400 measures a channel state of neighbor macro eNBs and neighbor relay eNBs including a relay eNB 420 periodically or in an event-driven manner, and transmits a measurement report message 401 including a measurement result to the macro eNB 410.

Upon receiving the measurement report message, the macro eNB 410 determines whether to perform a handover of the UE 400 to the neighbor macro eNB (or the neighbor relay eNB) on the basis of the measurement result in block 403. If a channel state between the UE 400 and the neighbor macro eNB (or the neighbor relay eNB) is better than a channel state between the UE 400 and the macro eNB 410, the macro eNB 410 may determine to perform the handover of the UE 400 to the neighbor macro eNB (or the neighbor relay eNB). By considering a situation where an L3 relay handover is performed from the macro eNB 410 to the relay eNB 420 by the UE 400, it is assumed in the present invention that the channel state between the UE 400 and the relay eNB 420 is better than the channel state between the UE 400 and the macro eNB 410, and the macro eNB 410 determines to perform a handover of the UE 400 to the relay eNB 420.

If it is determined to perform the handover of the UE 400 to the relay eNB 420, the macro eNB 410 performs call admission control for a call request of the UE 400 prior to a target eNB (i.e., the relay eNB 420) in block 405. The macro eNB 410 may perform the call admission control for the call request of the UE 400 by evaluating an amount of the radio link resource between the macro eNB 410 and the relay eNB 420. As a result, if the amount of the radio link resource between the macro eNB 410 and the relay eNB 420 is sufficient to allocate the radio link resource to the relay eNB 420, that is, if the amount of the radio link resource between the macro eNB 410 and the relay eNB 420 is greater than or equal to an amount of a radio link resource to be allocated to the relay eNB 420 according to the handover of the UE 400, the macro eNB 410 may determine to admit the call request of the UE 400, and otherwise, may determine to deny the call request. If it is determined that the call request of the UE 400 is denied in this case, the macro eNB 410 determines that the handover to the relay eNB 420 is impossible, and thus ends the handover process of the UE 400.

Figure 5:
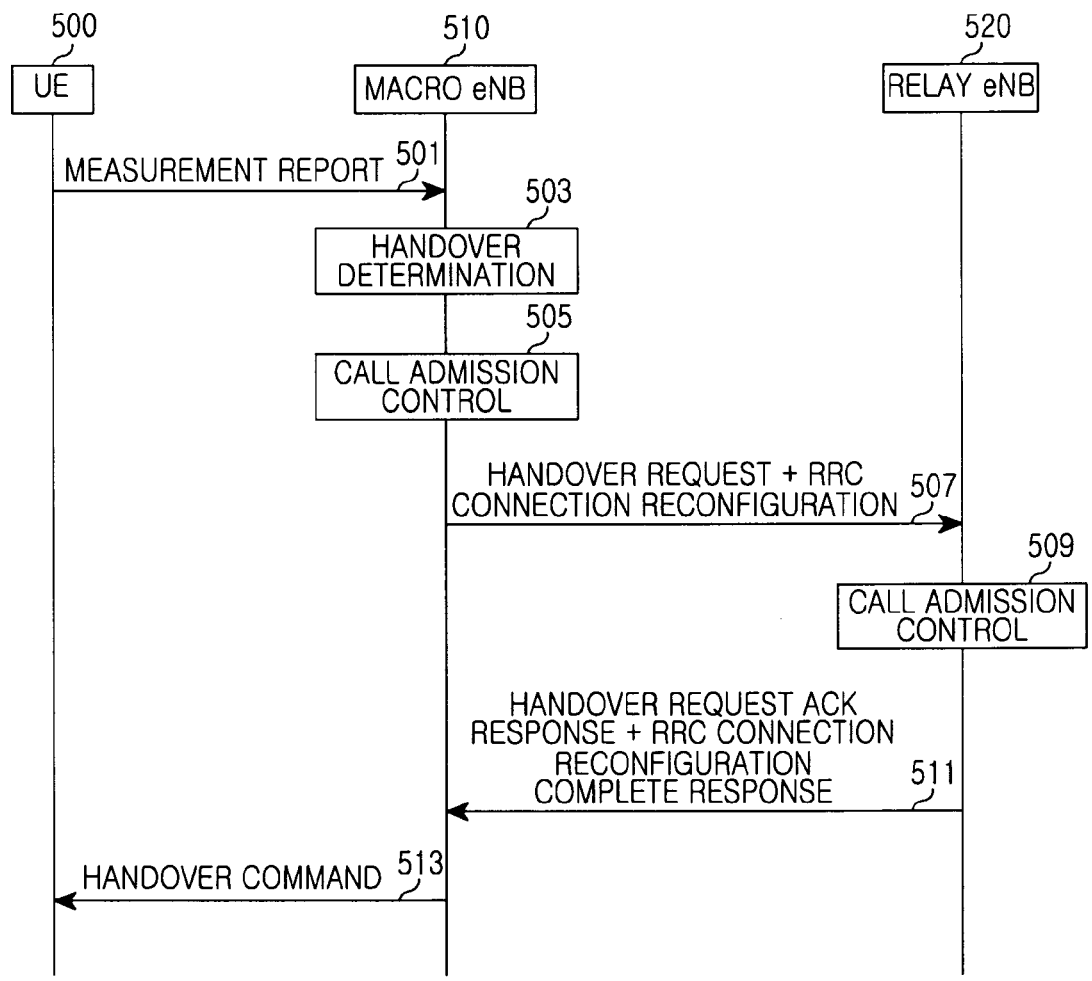
FIG. 5 illustrates a process of exchanging a handover signaling message for a handover from a macro eNB to a relay eNB having an RRC connection in a wireless communication system according to an embodiment of the present invention.

FIG. 5 illustrates a process of exchanging a handover signaling message for a handover from a macro eNB to a relay eNB having an RRC connection in a wireless communication system according to an embodiment of the present invention. In FIG. 5, call admission control of the relay eNB is successful, and thus the handover process is also successful.

Referring to FIG. 5, while receiving a service by accessing a macro eNB 510, a UE 500 measures a channel state of neighbor macro eNBs and neighbor relay eNBs including a relay eNB 520 periodically or in an event-driven manner, and transmits a measurement report message 501 including a measurement result to the macro eNB 510.

Upon receiving the measurement report message, the macro eNB 510 determines whether to perform a handover of the UE 500 to the neighbor macro eNB (or the neighbor relay eNB) on the basis of the measurement result in block 503. If a channel state between the UE 500 and the neighbor macro eNB (or the neighbor relay eNB) is better than a channel state between the UE 500 and the macro eNB 510, the macro eNB 510 may determine to perform the handover of the UE 500 to the neighbor macro eNB (or the neighbor relay eNB). By considering a situation where an L3 relay handover is performed from the macro eNB 510 to the relay eNB 520 by the UE 500, it is assumed in the present invention that the channel state between the UE 500 and the relay eNB 520 is better than the channel state between the UE 500 and the macro eNB 510, and the macro eNB 510 determines to perform the handover of the UE 500 to the relay eNB 520.

If it is determined to perform the handover of the UE 500 to the relay eNB 520, the macro eNB 510 performs call admission control for a call request of the UE 500 prior to a target eNB (i.e., the relay eNB 520) in block 505. The macro eNB 510 may perform the call admission control in block 505 for the call request of the UE 500 by evaluating an amount of the radio link resource between the macro eNB 510 and the relay eNB 520. As a result, if the amount of the radio link resource between the macro eNB 510 and the relay eNB 520 is sufficient to allocate the radio link resource to the relay eNB 520, that is, if the amount of the radio link resource between the macro eNB 510 and the relay eNB 520 is greater than or equal to an amount of a radio link resource to be allocated to the relay eNB 520 according to the handover of the UE 500, the macro eNB 510 may determine to admit the call request of the UE 500, and otherwise, may determine to deny the call request.

If the call request of the UE 500 is admitted, the macro eNB 510 transmits a handover request and RRC connection reconfiguration message 507 to the relay eNB 520 by integrating a handover request message and an RRC connection reconfiguration message. That is, the macro eNB 510 transmits an X2 signaling message and an RRC signaling message concurrently to the relay eNB 520.

Upon receiving the handover request and RRC connection reconfiguration message 507, the relay eNB 520 performs the call admission control for the call request of the UE 500 in block 509. The relay eNB 520 may perform the call admission control in block 509 for the call request of the UE 500 by evaluating an amount of the radio link resource between the relay eNB 520 and the UE 500. As a result, if the amount of the radio link resource between the relay eNB 520 and the UE 500 is sufficient to allocate the radio link resource to the UE 500, that is, if the amount of the radio link resource between the relay eNB 520 and the UE 500 is greater than or equal to an amount of a radio link resource to be allocated to the UE 500 according to the handover of the UE 500, the relay eNB 520 may determine to admit the call request of the UE 500, and otherwise, may determine to deny the call request.

Thereafter, if the call request of the UE 500 is admitted under the call admission control in block 509, the relay eNB 520 reconfigures an RRC connection, and transmits a handover request ACK response and RRC connection reconfiguration complete response message 511 to the macro eNB 510 by integrating a handover request ACK response message and an RRC connection reconfiguration complete response message.

Upon receiving the handover request ACK response and RRC connection reconfiguration complete response message 511, the macro eNB 510 determines that the handover to the relay eNB 520 is possible, transmits a handover command message 513 to the UE 500, and instructs the handover to the relay eNB 520.

Figure 6:
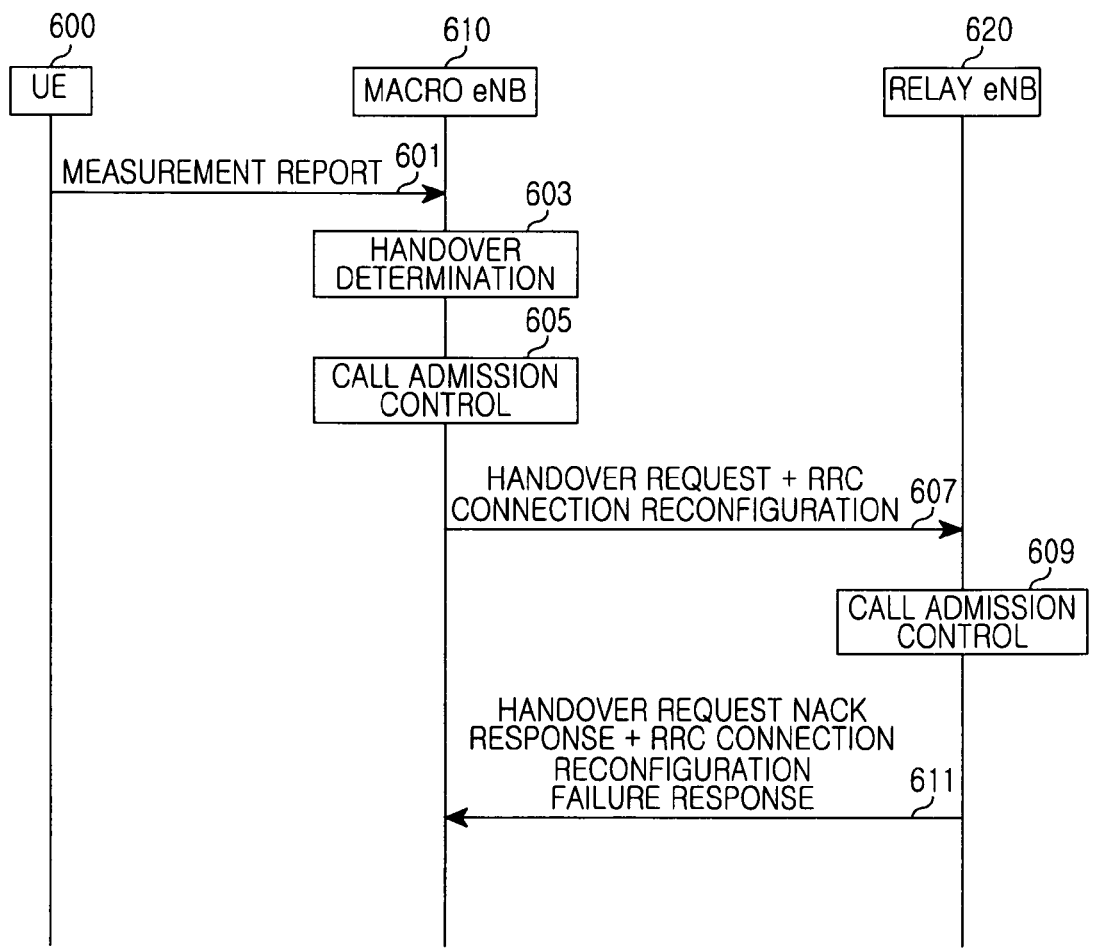
FIG. 6 illustrates a process of exchanging a handover signaling message for a handover from a macro eNB to a relay eNB having an RRC connection in a wireless communication system according to an embodiment of the present invention.

FIG. 6 illustrates a process of exchanging a handover signaling message for a handover from a macro eNB to a relay eNB having an RRC connection in a wireless communication system according to an embodiment of the present invention. In FIG. 6, call admission control of the relay eNB fails, and thus the handover process also fails.

Referring to FIG. 6, elements 601 to 609 of FIG. 6 are identical to elements 501 to 509 of FIG. 5 above, and thus descriptions on elements 601 to 609 will be omitted.

If a call request of a UE 600 is denied under the call admission control in block 609, a relay eNB 620 transmits a handover request NACK response and RRC connection reconfiguration failure response message 611 to a macro eNB 610 by integrating a handover request NACK response message and an RRC connection reconfiguration failure response message. In this example, upon receiving the handover request NACK response and RRC connection reconfiguration failure response message 611, the macro eNB 610 determines that a handover to the relay eNB 620 is impossible, and thus ends the handover process of the UE 600.

Figure 7:
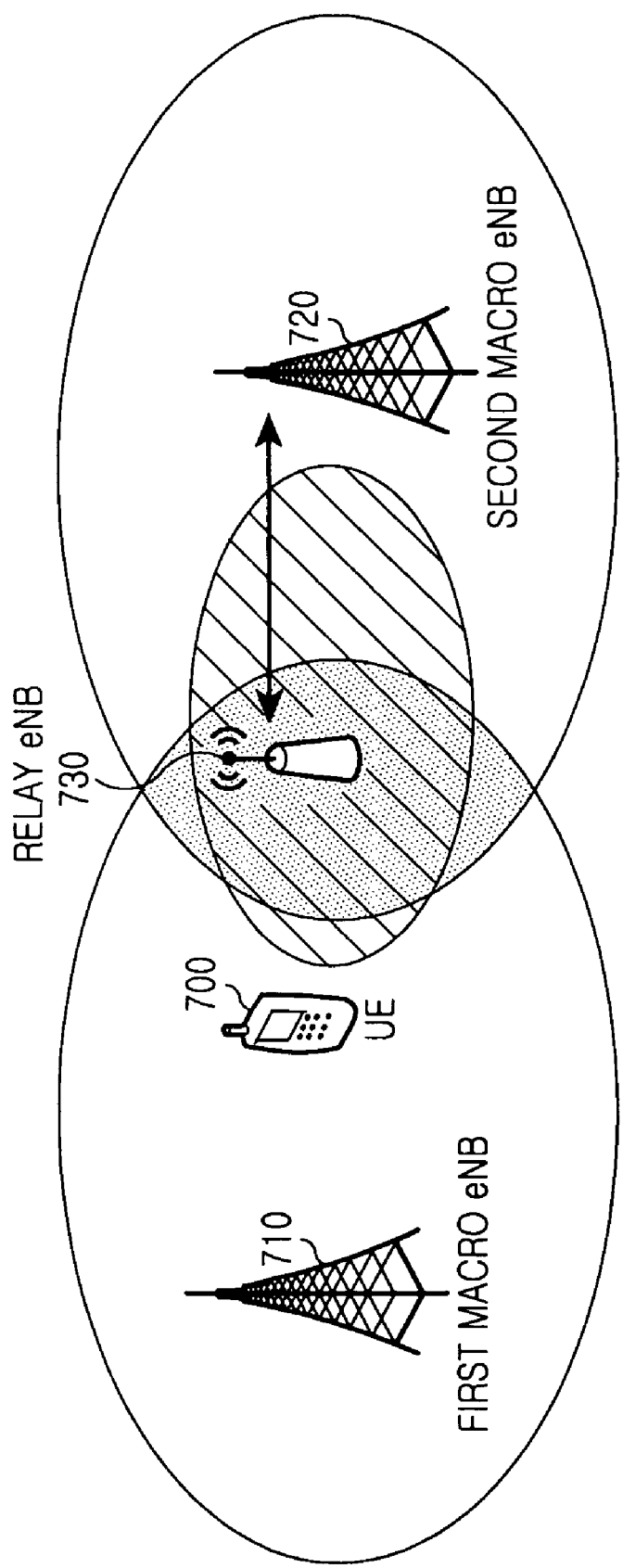
FIG. 7 illustrates a wireless communication system that supports a handover from a macro eNB to relay eBN of another macro eNB by a UE according to the principles of the present invention.

FIG. 7 illustrates a wireless communication system that supports a handover from a macro eNB to relay eNB of another macro eNB by a UE according to principles of the present invention.

Referring to FIG. 7, while receiving a service by accessing a first macro eNB 710 in an environment where the first macro eNB 710 and a second macro eNB 720 coexist, a UE 700 may move to a service cell area of a relay eNB 730 in a cell area of the second macro eNB 720. In this case, the UE 700 performs a handover from the first macro eNB 710 to the relay eNB 730 in the cell area of the second macro eNB 720.

Figure 8:
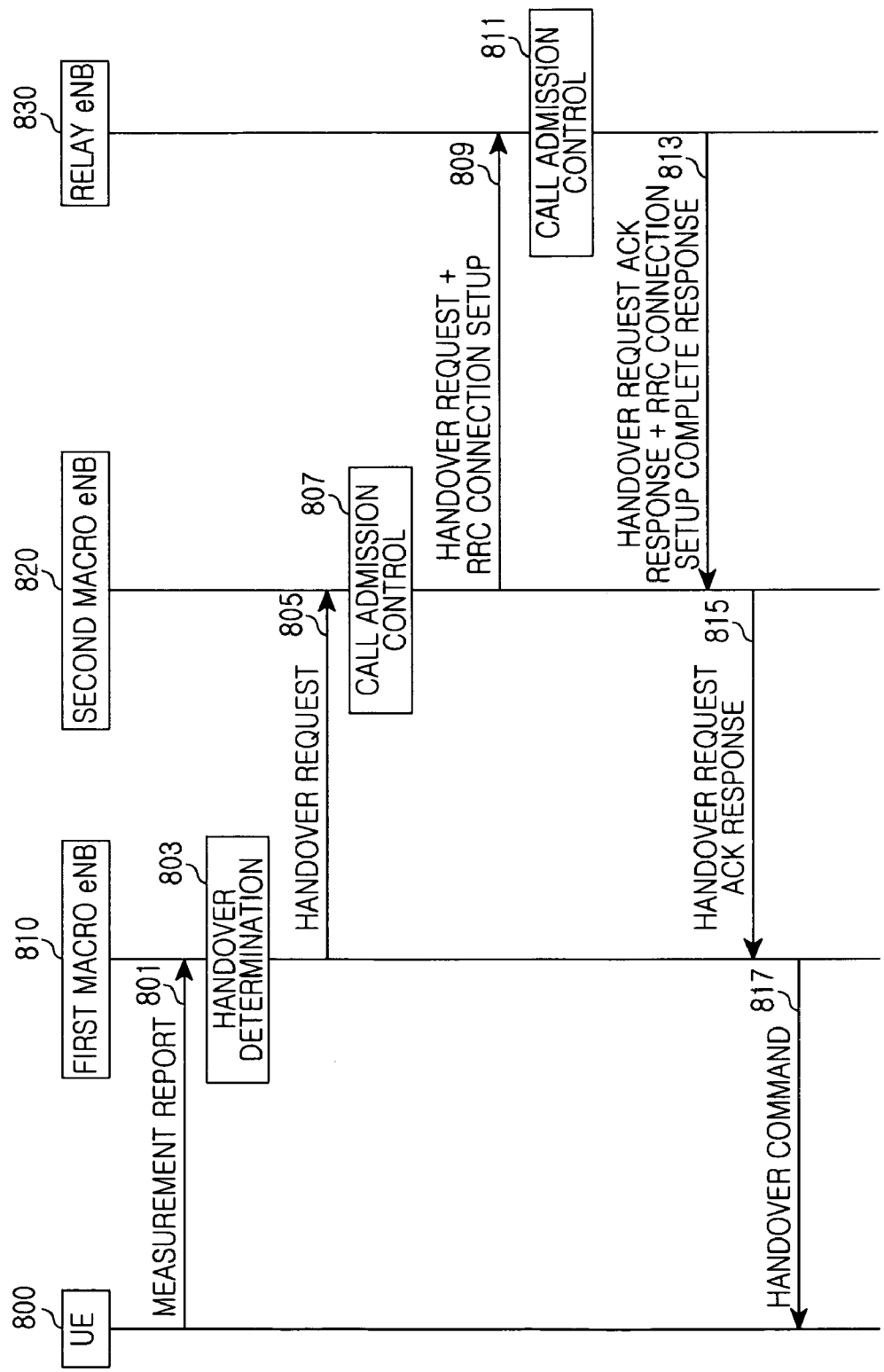
FIG. 8 illustrates a process of exchanging a handover signaling message for a handover from a first macro eNB to a relay eNB not having an RRC connection via a second macro eNB in a wireless communication system according to an embodiment of the present invention.

FIG. 8 illustrates a process of exchanging a handover signaling message for a handover from a first macro eNB to a relay eNB not having an RRC connection via a second macro eNB in a wireless communication system according to an embodiment of the present invention. In FIG. 8, call admission control of the relay eNB is successful, and thus the handover process is also successful.

Referring to FIG. 8, while receiving a service by accessing a first macro eNB 810, a UE 800 measures a channel state of neighbor macro eNBs and neighbor relay eNBs including a relay eNB 830 in a cell area of a second macro eNB 820 periodically or in an event-driven manner, and transmits a measurement report message 801 including a measurement result to the first macro eNB 810.

Upon receiving the measurement report message, the first macro eNB 810 determines whether to perform a handover of the UE 800 to the neighbor macro eNB (or the neighbor relay eNB) on the basis of the measurement result in block 803. If a channel state between the UE 800 and the neighbor macro eNB (or the neighbor relay eNB) is better than a channel state between the UE 800 and the first macro eNB 810, the first macro eNB 810 may determine to perform the handover of the UE 800 to the neighbor macro eNB (or the neighbor relay eNB). By considering a situation in which an L3 relay handover is performed from the first macro eNB 810 to the relay eNB 830 by the UE 800, it is assumed in the present invention that the channel state between the UE 800 and the relay eNB 830 is better than the channel state between the UE 800 and the first macro eNB 810, and the first macro eNB 810 determines to perform the handover of the UE 800 to the relay eNB 830.

If it is determined to perform the handover of the UE 800 to the relay eNB 830, the first macro eNB 810 transmits a handover request message 805 to the second macro eNB 820.

Upon receiving the handover request message, the second macro eNB 820 performs call admission control for the call request of the UE 800 prior to the relay eNB 830 in block 807. The second macro eNB 820 may perform the call admission control in block 807 for the call request of the UE 800 by evaluating an amount of the radio link resource the second macro eNB 820 and the relay eNB 830. As a result, if the amount of the radio link resource between the second macro eNB 820 and the relay eNB 830 is sufficient to allocate the radio link resource to the relay eNB 830, that is, if the amount of the radio link resource between the second macro eNB 820 and the relay eNB 830 is greater than or equal to an amount of a radio link resource to be allocated to the relay eNB 830 according to the handover of the UE 800, the second macro eNB 820 may determine to admit the call request of the UE 800, and otherwise, may determine to deny the call request.

If the call request of the UE 800 is admitted, the second macro eNB 820 transmits a handover request and RRC connection setup message 809 to the relay eNB 830 by integrating the handover request message and an RRC connection setup message. That is, the second macro eNB 820 transmits an X2 signaling message and an RRC signaling message concurrently to the relay eNB 830.

Upon receiving the handover request and RRC connection setup message, the relay eNB 830 performs the call admission control for the call request of the UE 800 in block 811. The relay eNB 830 may perform the call admission control for the call request of the UE 800 in block 811 by evaluating an amount of the radio link resource between the relay eNB 830 and the UE 800. As a result, if the amount of the radio link resource between the relay eNB 830 and the UE 800 is sufficient to allocate the radio link resource to the UE 800, that is, if the amount of the radio link resource between the relay eNB 830 and the UE 800 is greater than or equal to an amount of a radio link resource to be allocated to the UE 800 according to the handover of the UE 800, the relay eNB 830 may determine to admit the call request of the UE 800, and otherwise, may determine to deny the call request.

Thereafter, if the call request of the UE 800 is admitted under the call admission control in block 811, the relay eNB 830 sets up an RRC connection, and transmits a handover request ACK response and RRC connection setup complete response message 813 to the second macro eNB 820 by integrating a handover request ACK response message and an RRC connection setup complete response message.

Upon receiving the handover request ACK response and RRC connection setup complete response message, the second macro eNB 820 transmits handover request ACK response message 815 to the first macro eNB 810.

Upon receiving the handover request ACK response message, the first macro eNB 810 determines that the handover to the relay eNB 830 is possible, transmits a handover command message 817 to the UE 800, and instructs the handover to the relay eNB 830.

Meanwhile, although not shown, if the call request of the UE 800 is denied under the call admission control in block 811, the relay eNB 830 of FIG. 8 transmits a handover request NACK response and RRC connection setup failure response message to the second macro eNB 820 by integrating a handover request NACK response message and an RRC connection setup failure response message. Further, upon receiving the handover request NACK response and RRC connection setup failure response message, the second macro eNB 820 transmits a handover request NACK response message to the first macro eNB 810. In this case, upon receiving the handover request NACK response message, the first macro eNB 810 determines that the handover to the relay eNB 830 is impossible, and thus ends the handover process of the UE 800.

In addition, although not shown, if the call request of the UE 800 is denied under the call admission control in block 807, the second macro eNB 820 of FIG. 8 transmits a handover request NACK response message to the first macro eNB 810. In this case, upon receiving the handover request NACK response message, the first macro eNB 810 determines that the handover to the relay eNB 830 is impossible, and thus ends the handover process of the UE 800.

When the process of exchanging the handover signaling message is performed for the handover from the first macro eNB to the relay eNB having the RRC connection via the second macro eNB in the wireless communication system according to the embodiment of the present invention, instead of using the handover request and RRC connection setup message by integrating the handover request message and the RRC connection setup message in FIG. 8, a handover request and RRC connection reconfiguration message is used by integrating the handover request message and an RRC connection reconfiguration message. In this case, instead of using the handover request ACK/NACK response and RRC connection setup complete/failure response message by integrating the handover request ACK/NACK response message and the RRC connection setup complete/failure response message in FIG. 8, a handover request ACK/NACK response and RRC connection reconfiguration complete/failure response message is used by integrating a handover request ACK/NACK response message and an RRC connection reconfiguration complete/failure message.

Figure 9:
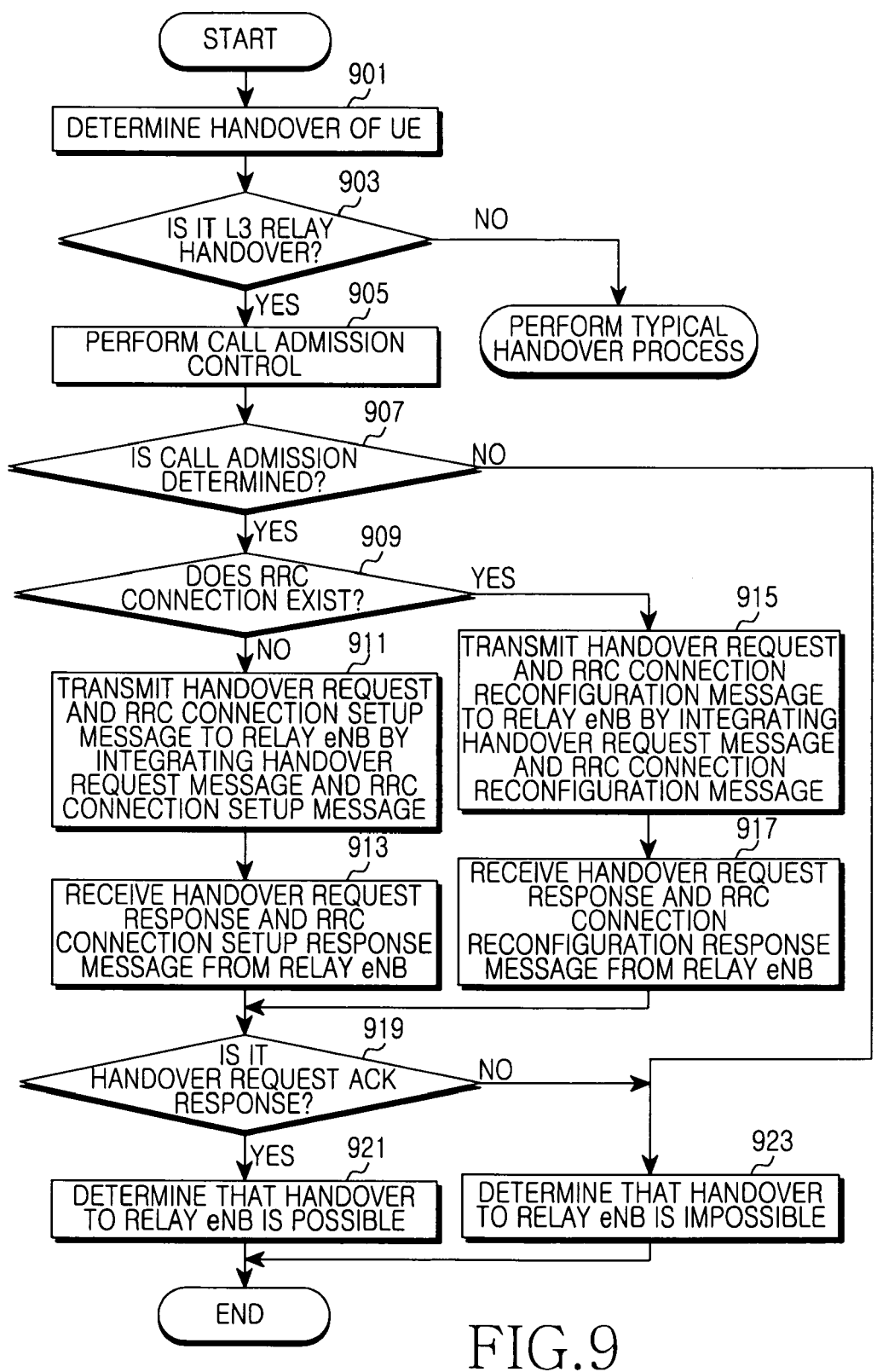
FIG. 9 illustrates a process of operating a macro eNB in a wireless communication system according to an embodiment of the present invention.

FIG. 9 illustrates a method of operating a macro eNB in a wireless communication system according to an embodiment of the present invention.

Referring to FIG. 9, the macro eNB receives from a UE a measurement report message including a result obtained by measuring a channel state of neighbor macro eNBs and neighbor relay eNBs periodically or in an event-driven manner, and determines whether to perform a handover of the UE to the neighbor macro eNB (or the neighbor relay eNB) on the basis of the measurement result. If a channel state between the UE and the neighbor macro eNB (or the neighbor relay eNB) is better than a channel state between the UE and the macro eNB, the macro eNB may determine to perform the handover of the UE to the neighbor macro eNB (or the neighbor relay eNB). By considering a situation where an L3 relay handover is performed from the macro eNB to the relay eNB by the UE, it is assumed in the present invention that the channel state between the UE and the relay eNB is better than the channel state between the UE and the macro eNB, and the macro eNB determines to perform the handover of the UE to the relay eNB in block 901. In another embodiment, the macro eNB may receive from the neighbor macro eNB a handover request message for requesting the handover of the UE to the relay eNB in a cell of the macro eNB.

Thereafter, the macro eNB determines whether the determined handover of the UE is an L3 relay handover in block 903.

If the determined handover of the UE is not the L3 relay handover in block 903, the macro eNB performs a typical handover process for the UE.

Otherwise, if the determined handover of the UE is the L3 relay handover in block 903, the macro eNB performs call admission control for a call request of the UE prior to a target eNB (i.e., the relay eNB) in block 905. The macro eNB may perform the call admission control for the call request of the UE by evaluating an amount of the radio link resource between the macro eNB and the relay eNB. As a result, if the amount of the radio link resource between the macro eNB and the relay eNB is sufficient to allocate the radio link resource to the relay eNB, that is, if the amount of the radio link resource between the macro eNB and the relay eNB is greater than or equal to an amount of a radio link resource to be allocated to the relay eNB according to the handover of the UE, the macro eNB may determine to admit the call request of the UE, and otherwise, may determine to deny the call request.

In block 907, the macro eNB determines whether the call request of the UE is admitted.

If the call request of the UE is denied in block 907, proceeding to block 923, the macro eNB determines that the handover to the relay eNB is impossible, and thus ends the handover process of the UE.

Otherwise, if the call request of the UE is admitted in block 907, proceeding to block 909, the macro eNB determines whether an RRC connection exists between the macro eNB and the relay eNB.

If it is determined in block 909 that the RRC connection does not exist between the macro eNB and the relay eNB, the macro eNB transmits a handover request and RRC connection setup message to the relay eNB by integrating a handover request message and RRC connection setup message in block 911. That is, the macro eNB transmits an X2 signaling message and an RRC signaling message concurrently to the relay eNB. Thereafter, the macro eNB receives the integrated handover request response and RRC connection setup response message from the relay eNB in block 913, and the procedure proceeds to block 919. Herein, the handover request and RRC connection setup message or the handover request response and RRC connection setup response message includes an indicator (='1') to indicate that corresponding message is a message obtained by integrating the X2 signaling message and the RRC signaling message.

Otherwise, if it is determined in block 909 that the RRC connection exists between the macro eNB and the relay eNB, the macro eNB transmits a handover request and RRC connection reconfiguration message to the relay eNB by integrating the handover request message and an RRC connection reconfiguration message in block 915. That is, the macro eNB transmits an X2 signaling message and an RRC signaling message concurrently to the relay eNB. Thereafter, the macro eNB receives the integrated handover request response and RRC connection reconfiguration response message from the relay eNB in block 917, and the procedure proceeds to block 919. Herein, the handover request and RRC connection reconfiguration message or the handover request response and RRC connection reconfiguration response message includes an indicator (='1') to indicate that corresponding message is a message obtained by integrating the X2 signaling message and the RRC signaling message.

Thereafter, the macro eNB evaluates the integrated handover request response and RRC connection setup response message or the integrated handover request response and RRC connection reconfiguration response message received from the relay eNB, and thus determines whether the received message is a message for ACK response for a handover request in block 919.

If it is determined in block 919 that the handover request response and RRC connection setup response message or the handover request response and RRC connection reconfiguration response message received from the relay eNB is a message for the ACK response for the handover request, proceeding to block 921, the macro eNB determines that the handover to the relay eNB is possible, transmits a handover command message to the UE, and instructs the handover to the relay eNB. In another embodiment, if it is assumed that the macro eNB receives from the neighbor macro eNB the handover request message for requesting the handover of the UE the relay eNB in the cell of the macro eNB, instead of transmitting the handover command message to the UE, the macro eNB may transmit a handover request ACK response message to the neighbor macro eNB to allow the neighbor macro eNB to transmit the handover command message to the UE.

Otherwise, if it is determined in block 919 that the handover request response and RRC connection setup response message or the handover request response and RRC connection reconfiguration response message received from the relay eNB is a message for the NACK response for the handover request, proceeding to block 923, the macro eNB determines that the handover to the relay eNB is impossible, and ends the handover process of the UE. In another embodiment, if it is assumed that the macro eNB receives from the neighbor macro eNB the handover request message for requesting the handover of the UE to the relay eNB in the cell of the macro eNB, the macro eNB may transmit a handover request NACK response message to the neighbor macro eNB to allow the neighbor macro eNB to ends the handover process of the UE.

Thereafter, the procedure of FIG. 9 ends.

Figure 10:
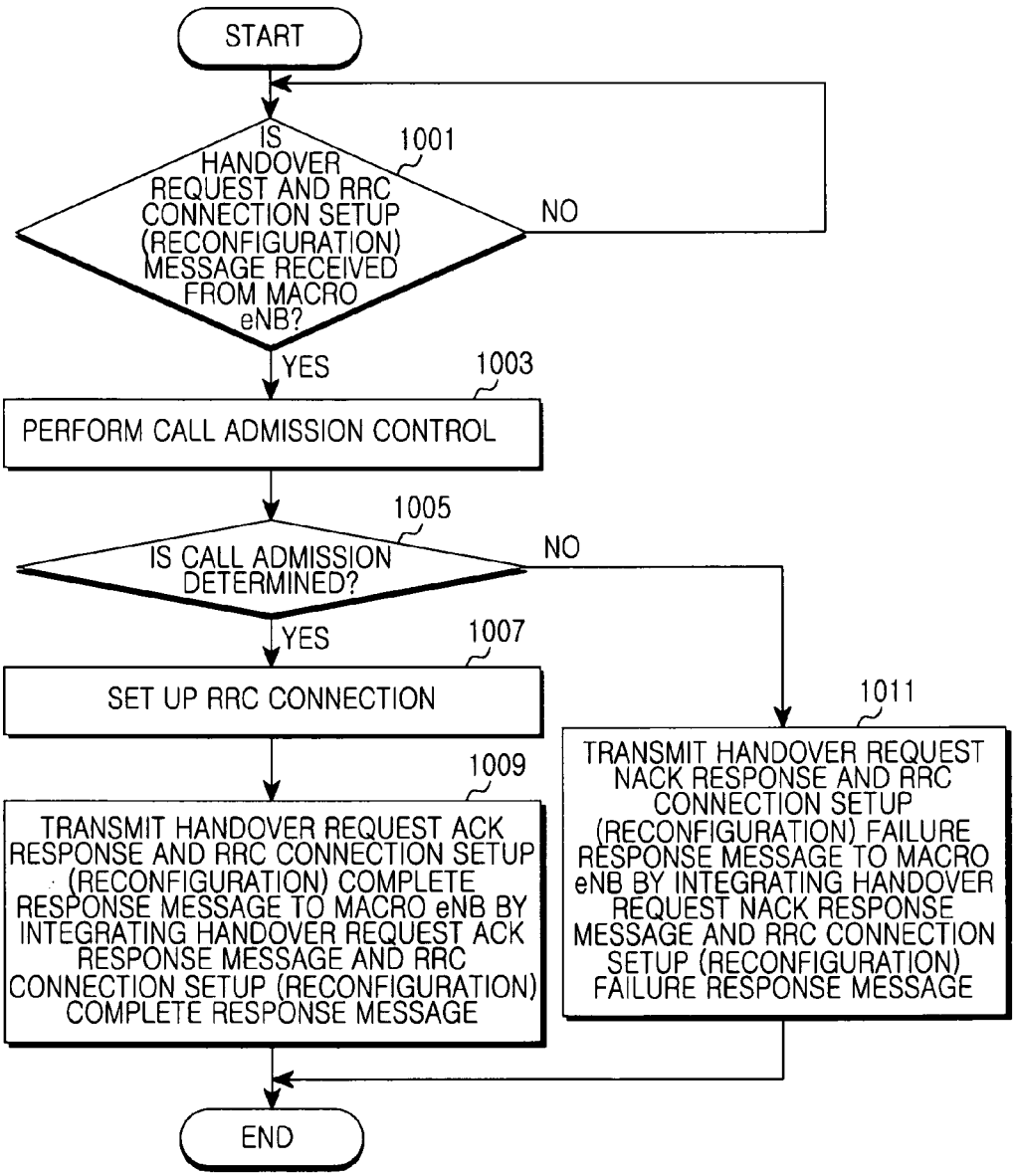
FIG. 10 illustrates a process of operating a relay eNB in a wireless communication system according to an embodiment of the present invention.

FIG. 10 illustrates a method of operating a relay eNB in a wireless communication system according to an embodiment of the present invention.

Referring to FIG. 10, the relay eNB determines whether a handover request and RRC connection setup (or reconfiguration) message is received from a macro eNB in block 1001. The handover request and RRC connection setup (reconfiguration) message is a message obtained by integrating a handover request message for requesting a call of a UE and an RRC connection setup (reconfiguration) message for requesting RRC connection setup (reconfiguration) between the macro eNB and the relay eNB. The handover request and RRC connection setup (reconfiguration) message includes an indicator (='1') to indicate that corresponding message is a message obtained by integrating an X2 signaling message and an RRC signaling message. Whether the handover request and RRC connection setup (reconfiguration) message is received may be determined by evaluating the indicator.

If the integrated handover request and RRC connection setup (reconfiguration) message is received in block 1001, the relay eNB performs call admission control for a call request of the UE in block 1003. The relay eNB may perform the call admission control for the call request of the UE by evaluating an amount of the radio link resource between the relay eNB and the UE. As a result, if the amount of the radio link resource between the relay eNB and the UE is sufficient to allocate the radio link resource to the UE, that is, if the amount of the radio link resource between the relay eNB and the UE is greater than or equal to an amount of a radio link resource to be allocated to the UE according to the handover of the UE, the relay eNB may determine to admit the call request of the UE, and otherwise, may determine to deny the call request.

Thereafter, the relay eNB determines whether the call request of the UE is admitted in block 1005.

If the call request of the UE is admitted in block 1005, the relay eNB sets up (or reconfigures) an RRC connection between the macro eNB and the relay eNB in block 1007, and transmits a handover request ACK response and RRC connection setup (reconfiguration) complete response message to the macro eNB by integrating a handover request ACK response message and an RRC connection setup (reconfiguration) complete response message in block 1009. The handover request ACK response and RRC connection setup (reconfiguration) complete response message includes an indicator (='1') to indicate that corresponding message is a message obtained by integrating an X2 signaling message and an RRC signaling message.

Otherwise, if the call request of the UE is denied in block 1005, the relay eNB transmits a handover request NACK response and RRC connection setup (reconfiguration) failure response message to the macro eNB by integrating a handover request NACK response message and an RRC connection setup (reconfiguration) failure response message in block 1011. The handover request NACK response and RRC connection setup (reconfiguration) failure response message includes an indicator (='1') to indicate that corresponding message is a message obtained by integrating an X2 signaling message and an RRC signaling message.

Thereafter, the procedure of FIG. 10 ends.

Figure 11:
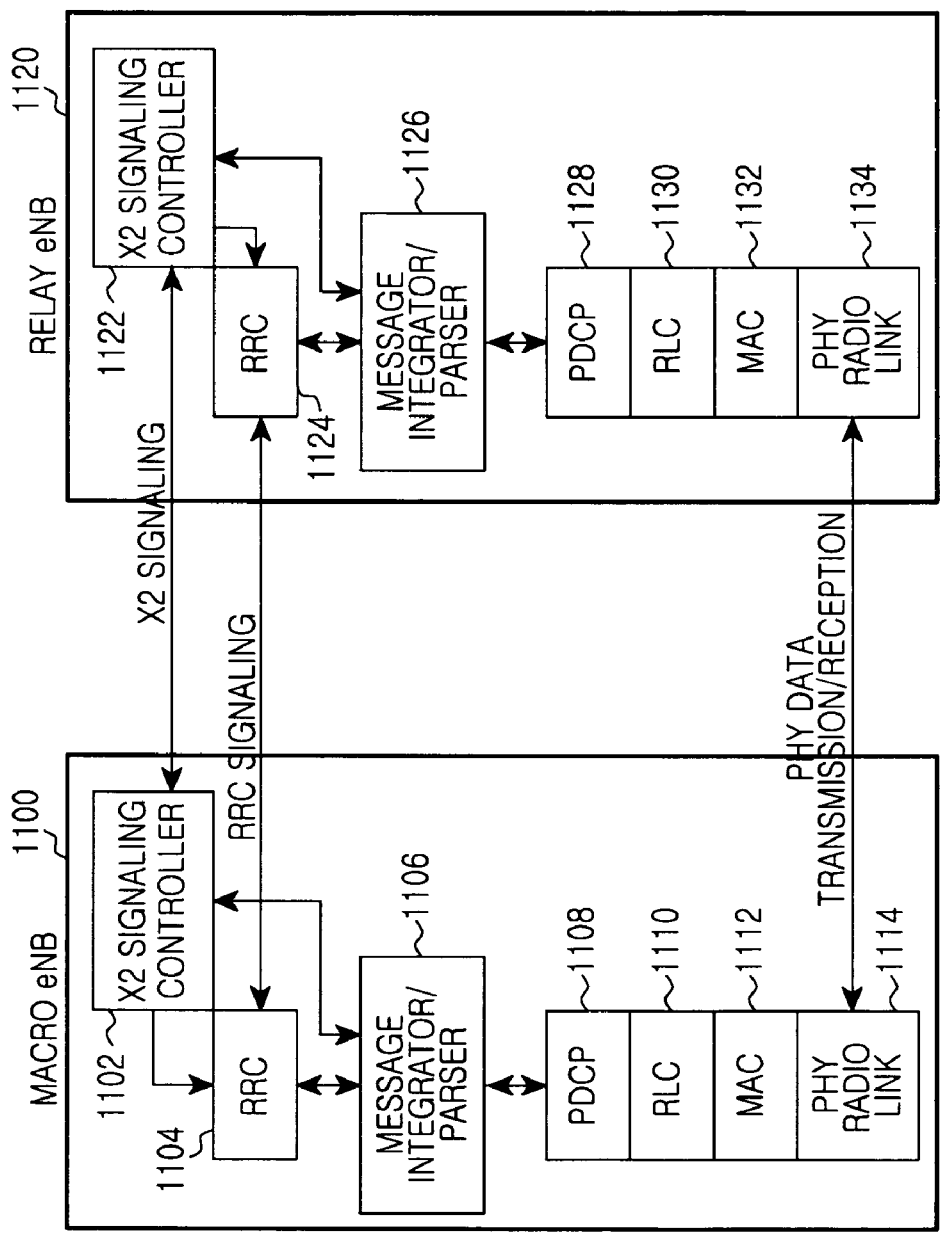
FIG. 11 illustrates a macro eNB and a relay eNB in a wireless communication system according to an embodiment of the present invention.

FIG. 11 illustrates a macro eNB and a relay eNB in a wireless communication system according to an embodiment of the present invention.

Referring to FIG. 11, a macro eNB 1100 and a relay eNB 1120 respectively include X2 signaling controllers 1102 and 1122, Radio Resource Control (RRC) layers 1104 and 1124, message integrators/parsers 1106 and 1126, Packet Data Convergence Protocol (PDCP) layers 1108 and 1128, Radio Link Control (RLC) layers 1110 and 1130, Medium Access Control (MAC) layers 1112 and 1132, and PHYsical (PHY)-radio link layers 1114 and 1134.

Regarding the X2 signaling controllers 1102 and 1122, the X2 signaling controller 1102 of the macro eNB 1100 performs call admission control for the UE upon detecting an L3 relay handover of the UE to the relay eNB 1120. If the call admission control for the UE is successful, the X2 signaling controller 1102 of the macro eNB 1100 provides the message integrator/parser 1106 with a handover request message to be transmitted to the relay eNB 1120, and allows the RRC layer 1104 to provide the message integrator/parser 1106 with an RRC connection setup (reconfiguration) message according to whether an RRC connection exists. In addition, the X2 signaling controller 1102 of the macro eNB 1100 determines whether the handover of the UE to the relay eNB 1120 is possible by using a handover request response message received from the message integrator/parser 1106. If the call admission control for the UE fails, the X2 signaling controller 1102 of the macro eNB 1100 may determine that the handover to the relay eNB 1120 is impossible before performing a process of exchanging a handover signaling message.

The X2 signaling controller 1122 of the relay eNB 1120 receives the handover request message for the UE via the message integrator/parser 1126, and performs call admission control for the UE. Thereafter, the X2 signaling controller 1122 of the relay eNB 1120 provides the message integrator/parser 1126 with a handover request response message according to whether the call admission control is successful, and allows the RRC layer 1124 to set up (reconfigure) an RRC connection and to provide the message integrator/parser 1126 with an RRC connection setup (reconfiguration) response message.

The RRC layers 1104 and 1124 are L3 layers, and perform a function of allocating or releasing a radio resource between the eNB and the UE. In particular, the RRC layer 1104 of the macro eNB 1100 determines whether an RRC connection exists at the request of the X2 signaling controller 1102, provides the message integrator/parser 1106 with an RRC connection setup (reconfiguration) message according to the determination result, and processes an RRC connection setup (reconfiguration) response message provided from the message integrator/parser 1106. In addition, the RRC layer 1124 of the relay eNB 1120 sets up/reconfigures an RRC connection at the request of the X2 signaling controller 1122, and provides the message integrator/parser 1126 with an RRC connection setup (reconfiguration) response message according to the setup/reconfiguration result.

The message integrators/parsers 1106 and 1126 integrate different-layer messages and parse the integrated messages into different-layer messages. In particular, the message integrators/parsers 1106 and 1126 integrate X2 signaling messages provided from the X2 signaling controllers 1102 and 1122 and RRC signaling messages provided from the RRC layers 1104 and 1124, and provide integrated handover signaling messages to the PDCP layers 1108 and 1128. In addition, the message integrators/parsers 1106 and 1126 parse the integrated handover signaling messages provided from the PDCP layers 1108 and 1128 into X2 signaling messages and RRC signaling messages, provide the parsed X2 signaling messages to the X2 signaling controllers 1102 and 1122, and provide the parsed RRC signaling messages to the RRC layers 1104 and 1124.

The PDCP layers 1108 and 1128 are L2 layers and provide header compression for data transmitted in an IP packet format, that is, convert the data to a format suitable for the RLC layers 1110 and 1130, and provide the converted data to the RLC layers 1110 and 1130.

The RLC layers 1110 and 1130 are L2 layers, support reliable data transmission, and perform a segmentation and concatenation function of a RLC Service Data Unit (SDU) delivered from higher layers.

The MAC layers 1112 and 1132 are L2 layers, and map various logical channels to various transport channels. The MAC layers 1112 and 1132 are coupled to the RLC layers 1110 and 1130 through the logical channels, and are coupled to the PHY-radio link layers 1114 and 1134 through the transport channels.

The PHY-radio link layers 1114 and 1134 are L1 layers and provide an information transfer service to higher layers by using physical channels. The PHY-radio link layers 1114 and 1134 are coupled to the MAC layers 1112 and 1132 through the transport channels. Data between the MAC layers 1112 and 1132 and the PHY-radio link layers 1114 and 1134 is transferred through the transport channels. In addition, data is transferred between the different PHY-radio link layers 1114 and 1134, that is, the PHY-radio link layers 1114 and 1134 of a transmitting side and a receiving side, through the physical channels.

Meanwhile, according to an embodiment of the present invention, a relay eNB performs call admission control before an RRC connection is set up between a macro eNB and the relay eNB, and thus an RRC connection setup (reconfiguration) message transmitted by the macro eNB to the relay eNB has to include Quality of Service (QoS) parameters required for call admission control. Herein, the QoS parameter includes a QoS Class Index (QCI), a Packet Delay Budget (PDB), a Maximum Bit Rate (MBR), a Guaranteed Bit Rate (GBR), and so forth. That is, by using the QoS parameters, the relay eNB may determine whether a specific QoS may be supported to a UE and thus may determine whether a call of the UE is admitted.

According to exemplary embodiment of the present invention, an RRC connection may be set up or reconfigured even if a handover fails. In such a situation, the RRC connection released.

According to exemplary embodiments of the present invention, a wireless communication system integrates an X2 signaling message and RRC signaling message exchanged between a macro eNB and a relay eNB for a handover of a UE. Therefore, an amount of messages exchanged between the macro eNB and the relay eNB for the handover of the UE is reduced, and thus a handover delay occurring in L3 relay may also be reduced. In addition, for the handover of the UE to the relay eNB, the macro eNB performs call admission control prior to the relay eNB, thus there is an advantage in that a case of unnecessarily exchanging a handover signaling message may be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of supporting a handover of a User Equipment (UE) by a macro evolved Node-B (eNB) in a wireless communication system, the method comprising:
   determining a handover of the UE to a relay eNB;
   transmitting a handover request and Radio Resource Control (RRC) connection setup message to the relay eNB by integrating a handover request message for requesting a handover of the UE and an RRC connection setup message for requesting RRC connection setup between the macro eNB and the relay eNB; and
   receiving from the relay eNB a handover request response and RRC connection setup response message by integrating a handover request response message and an RRC connection setup response message.

2. The method of claim 1, further comprising performing call admission control for the UE before the transmitting of the handover request and RRC connection setup message.

3. The method of claim 2, wherein the performing of the call admission control comprises:
- evaluating an amount of radio link resources between the macro eNB and the relay eNB;
- determining to admit a call of the UE if the evaluated amount of radio link resources between the macro eNB and the relay eNB is greater than or equal to an amount of radio link resources to be allocated to the relay eNB according to the handover of the UE; and
- determining to deny the call of the UE if the evaluated amount of radio link resources between the macro eNB and the relay eNB is less than an amount of radio link resources to be allocated to the relay eNB according to the handover of the UE.

4. The method of claim 3, further comprising:
- determining whether an RRC connection already exists between the macro eNB and the relay eNB prior if the call of the UE is admitted; and
- if the RRC connection between the macro eNB and the relay eNB exists:
  - transmitting a handover request and RRC connection reconfiguration message to the relay eNB by integrating the handover request message for requesting the handover of the UE and an RRC connection reconfiguration message for requesting RRC connection reconfiguration between the macro eNB and the relay eNB, and
  - receiving from the relay eNB a handover request response and RRC connection reconfiguration response message by integrating a handover request response message and an RRC connection reconfiguration response message,
- wherein the handover request and RRC connection setup message is transmitted when the RRC connection does not exist between the macro eNB and the relay eNB.

5. The method of claim 4, further comprising:
- determining whether one of 1) the handover request response and RRC connection setup response message and 1) the handover request response and RRC connection reconfiguration response message received from the relay eNB is an acknowledgment (ACK) response.

6. The method of claim 5, further comprising:
- in response to determining the ACK response:
  - transmitting a handover command message to the UE if the ACK response is received, and
  - instructing the handover to the relay eNB.

7. The method of claim 1, wherein integrating the handover request message and the RRC connection setup message comprises transmitting an X2 signaling message and an RRC signaling message concurrently to the relay eNB.

8. A method of supporting a handover of a User Equipment (UE) by a relay evolved Node-B (eNB) in a wireless communication system, the method comprising:
- receiving from a macro eNB a handover request and Radio Resource Control (RRC) connection setup message by integrating a handover request message for requesting a handover of the UE and an RRC connection setup message for requesting RRC connection setup between the macro eNB and the relay eNB;
- performing call admission control for the UE; and
- transmitting a handover request response and RRC connection setup response message to the macro eNB by integrating a handover request response message and RRC connection setup response message according to a result obtained by performing the call admission control.

9. The method of claim 8, wherein the performing of the call admission control comprises:
- evaluating an amount of radio link resources between the relay eNB and the UE;
- determining to admit a call of the UE if the evaluated amount of radio link resources between the relay eNB and the UE is greater than or equal to an amount of radio link resources to be allocated to the UE according to the handover of the UE; and
- determining to deny the call of the UE if the evaluated amount of radio link resources between the relay eNB and the UE is less than an amount of radio link resources to be allocated to the UE according to the handover of the UE.

10. The method of claim 9, further comprising setting up an RRC connection between the macro eNB and the relay eNB if the call of the UE is admitted.

11. A macro evolved Node-B (eNB) for supporting a handover of a User Equipment (UE) in a wireless communication system, the macro eNB comprising:
- a message integrator configured to create a handover request and Radio Resource Control (RRC) connection setup message by integrating a handover request message for requesting a handover of the UE and an RRC connection setup message for requesting an RRC connection setup between the macro eNB and a relay eNB according to a determination result on a handover of the UE to the relay eNB; and
- a physical-radio link layer configured to transmit the generated handover request and RRC connection setup message to the relay eNB and receive a handover request response and RRC connection setup response message from the relay eNB by integrating a handover request response message and an RRC connection setup response message.

12. The macro eNB of claim 11, further comprising an X2 signaling controller configured to perform call admission control for the UE.

13. The macro eNB of claim 12, wherein the X2 signaling controller is further configured to evaluate an amount of radio link resources between the macro eNB and the relay eNB, admit a call of the UE if the evaluated amount of radio link resources between the macro eNB and the relay eNB is greater than or equal to an amount of radio link resources to be allocated to the relay eNB according to the handover of the UE, and deny the call of the UE if the evaluated amount of radio link resources between the macro eNB and the relay eNB is less than an amount of radio link resources to be allocated to the relay eNB according to the handover of the UE.

14. The macro eNB of claim 13, further comprising an RRC layer configured to detect an RRC connection between the macro eNB and the relay eNB if the call of the UE is admitted,
- wherein, if the RRC connection between the macro eNB and the relay eNB exists, the message integrator is further configured to generate a handover request and RRC connection reconfiguration message by integrating the handover request message for requesting the handover of the UE and an RRC connection reconfiguration message for requesting RRC connection reconfiguration between the macro eNB and the relay eNB,
- wherein the physical-radio link layer is further configured to transmit the generated handover request and RRC connection reconfiguration message to the relay eNB, and receive from the relay eNB a handover request response and RRC connection reconfiguration response message by integrating a handover request response message and an RRC connection reconfiguration response message, and
wherein the massage integrator is further configured to generate the handover request and RRC connection setup message when the RRC connection between the macro eNB and the relay eNB does not exist.

15. The macro eNB of claim 11, further comprising Radio Link Control (RLC) layer configured to support reliable data transmission and perform a segmentation and concatenation function.

16. The macro eNB of claim 11, further comprising a Packet Data Convergence Protocol (PDCP) layer configured to convert data to a format suitable for the RLC layer.

17. The macro eNB of claim 11, further comprising a Medium Access Control (MAC) layer coupled to the RLC layer and the physical-radio link layer, the MAC layer configured to map a set of logical channels to a set of transport channels.

18. A relay evolved Node-B (eNB) for supporting a handover of a User Equipment (UE) in a wireless communication system, the relay eNB comprising:
a physical-radio link layer configured to receive from a macro eNB a handover request and Radio Resource Control (RRC) connection setup message by integrating a handover request message for requesting a handover of the UE and an RRC connection setup message for requesting RRC connection setup between the macro eNB and the relay eNB;
an X2 signaling controller configured to perform call admission control for the UE; and
a message integrator configured to generate a handover request response and RRC connection setup response message by integrating a handover request response message and RRC connection setup response message according to a result obtained by performing the call admission control,
wherein the physical-radio link layer is configured to transmit the generated handover request response and RRC connection setup response message to the macro eNB.

19. The relay eNB of claim 18, wherein the X2 signaling controller is configured to evaluate an amount of radio link resources between the relay eNB and the UE, admit a call of the UE if the evaluated amount of radio link resources between the relay eNB and the UE is greater than or equal to an amount of radio link resources to be allocated to the UE according to the handover of the UE, and deny the call of the UE if the evaluated amount of radio link resources between the relay eNB and the UE is less than an amount of radio link resources to be allocated to the UE according to the handover of the UE.

20. The relay eNB of claim 19, further comprising an RRC layer configured to set up an RRC connection between the macro eNB and the relay eNB if the call of the UE is admitted.

* * * * *